United States Patent [19]

Shelton

[11] Patent Number: 4,540,192
[45] Date of Patent: Sep. 10, 1985

[54] THREE-WHEELED SCOOTER-TYPE VEHICLE

[76] Inventor: L. H. Shelton, 6971 Fords Station Rd., Germantown, Tenn. 38138

[21] Appl. No.: 565,903

[22] Filed: Dec. 27, 1983

[51] Int. Cl.³ .............................................. B62K 17/00
[52] U.S. Cl. .............................. 280/282; 280/87.04 R; 280/220
[58] Field of Search ................... 280/7.13, 8, 11.1 BT, 280/11.21, 12.1, 12.12, 21, 62, 87.04 R, 87.04 A, 112 R, 112 A, 200, 210, 218, 220, 235, 239, 253, 275, 278, 282, 287, 293, 606, 11.11 S; D12/112, 113; D21/71, 80; 272/126, 127, 114

[56] References Cited

U.S. PATENT DOCUMENTS

| 2,577,416 | 12/1951 | Geisse | 280/282 X |
|---|---|---|---|
| 2,819,907 | 1/1958 | Thoresen | 280/7.13 |
| 4,047,732 | 12/1977 | Williams et al. | 280/287 |
| 4,065,146 | 12/1977 | Denzer | 280/278 |
| 4,076,270 | 2/1978 | Winchell | 280/220 |
| 4,087,106 | 5/1978 | Winchell | 280/220 |
| 4,088,338 | 5/1978 | Winchell et al. | 280/220 |
| 4,123,079 | 10/1978 | Biskup | 280/87.04 A |
| 4,134,600 | 1/1979 | McDonald et al. | 280/87.04 A |
| 4,165,093 | 8/1979 | Biskup | 280/220 |

FOREIGN PATENT DOCUMENTS

| 2534484 | 2/1976 | Fed. Rep. of Germany | 280/27 |
|---|---|---|---|
| 45-112140 | 11/1974 | Japan | 280/282 |

Primary Examiner—Joseph F. Peters, Jr.
Assistant Examiner—Charles R. Watts
Attorney, Agent, or Firm—Fleit, Jacobson, Cohn & Price

[57] ABSTRACT

A three-wheeled scooter type of vehicle which is forwardly propelled by the body movement of the occupant by means of two rearwardly extending foot support frames which are pivotally connected to a front steering column. The foot support frames are provided with caster wheels which are yieldably tensioned to propel the vehicle in a direction of forward travel when the foot support frames are laterally moved.

6 Claims, 7 Drawing Figures

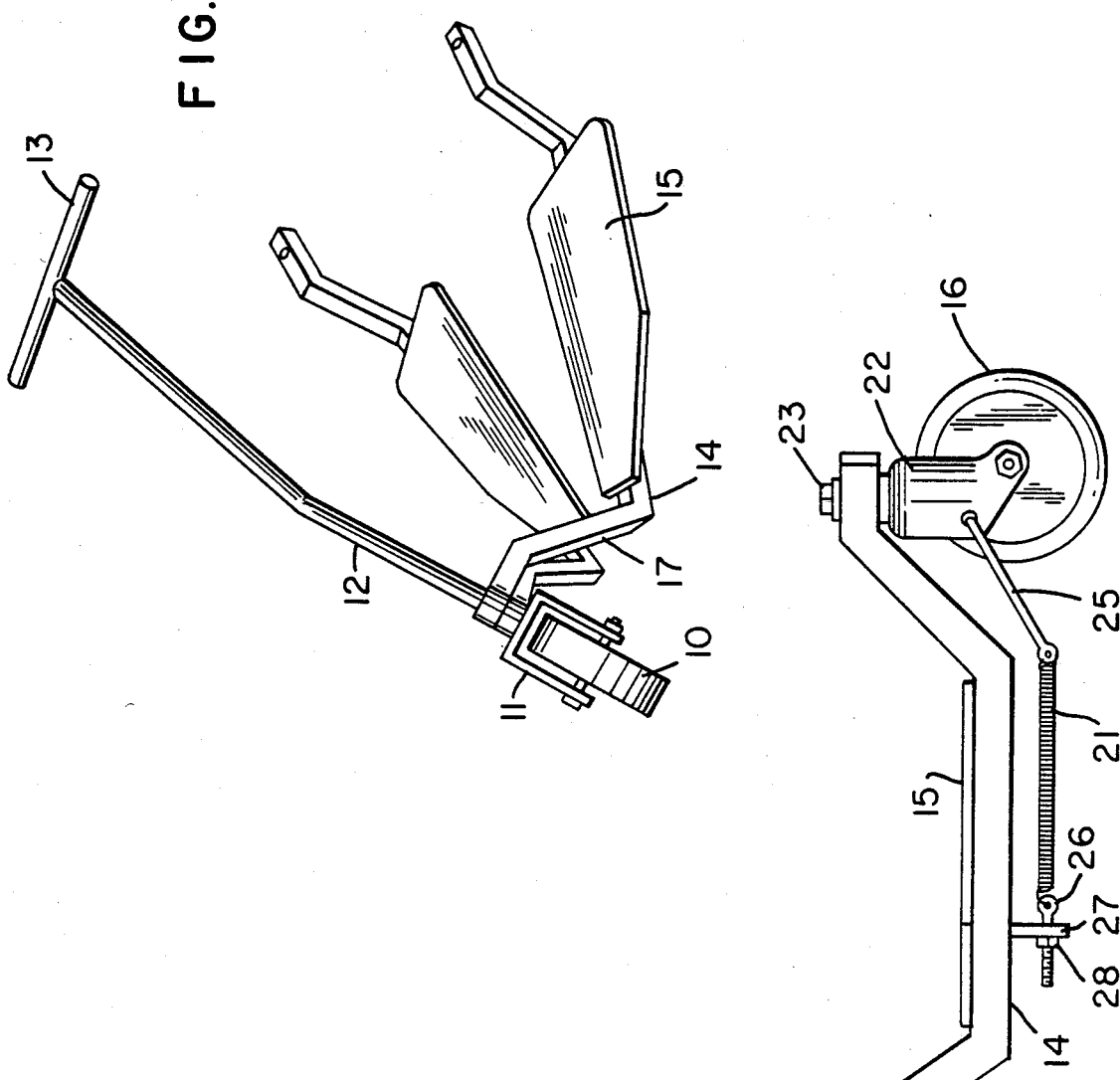
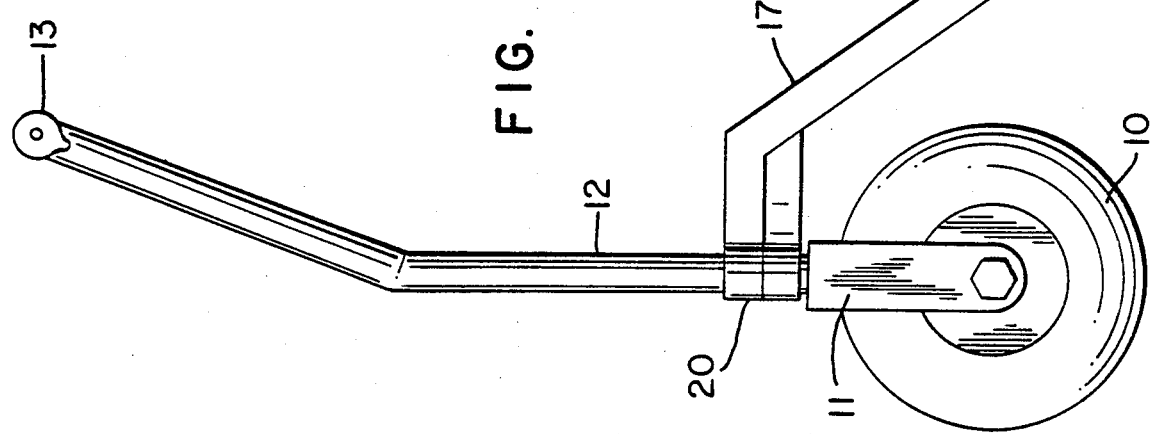

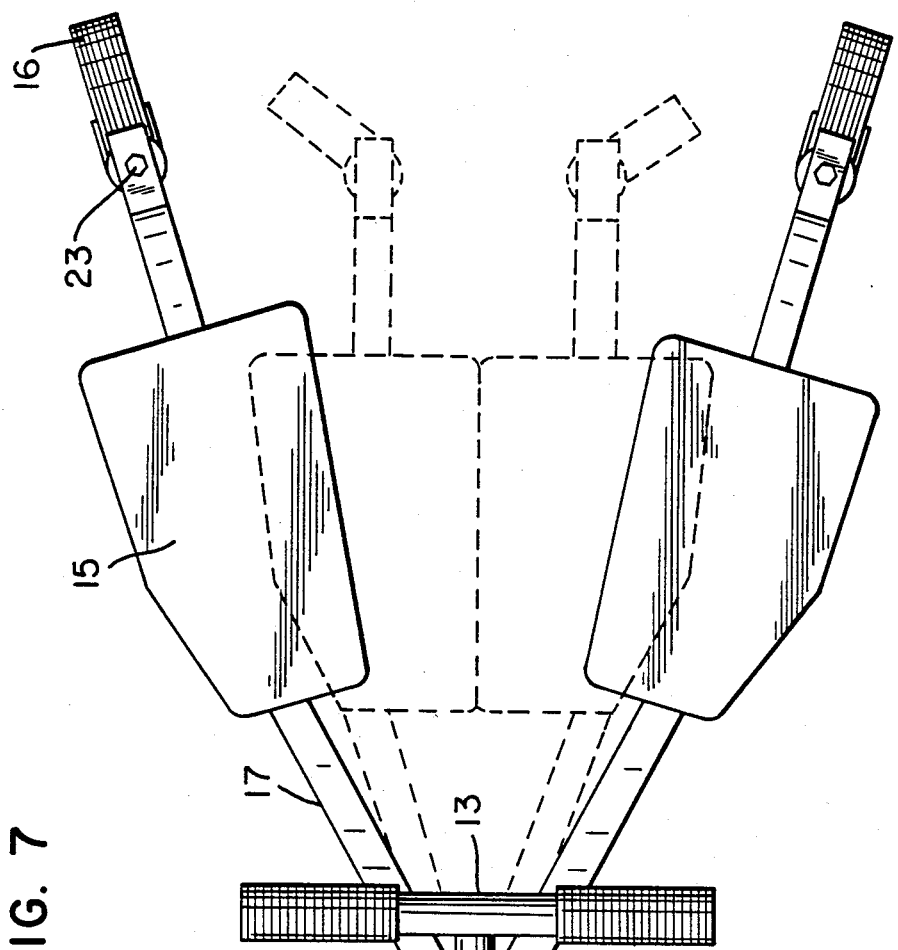
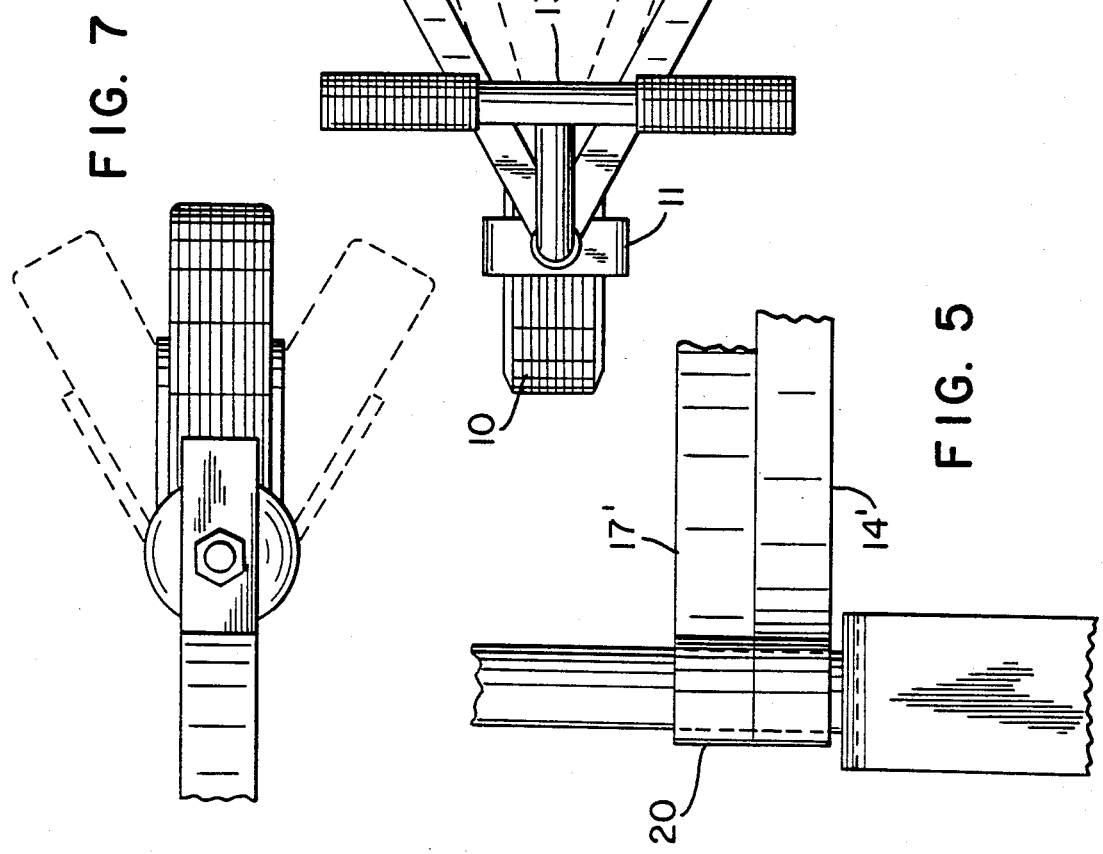

THREE-WHEELED SCOOTER-TYPE VEHICLE

SUMMARY OF THE INVENTION

This invention relates to wheeled vehicles and, more particularly, pertains to a wheeled vehicle which is forwardly propelled by the body movement of the occupant. The object of the present invention is to provide a three-wheeled scooter-type vehicle, comprising a front supporting hand-controlled steering wheel, a pair of rearwardly extending foot support frames pivotally connected with the front steering column, each of said foot support frames being carried on a caster wheel with ball bearings for independent sidewise swinging movement, each of said caster wheels being yieldably tensioned in a direction of forward travel of the vehicle. With such a scooter, the operator stands on the foot support frames and moves the same in and out with respect to each other, causing rotation of the caster wheels for effecting the propulsion of the vehicle in a forward direction.

BRIEF DESCRIPTION OF THE DRAWINGS

FIG. 1 is a side elevation of a scooter-type vehicle made in accordance with the invention;

FIG. 2 is a plan view of the vehicle shown in FIG. 1, showing how the side movement of the foot supports effects the propulsion of the vehicle;

FIG. 4 is a perspective detail of one of the side supporting elements, with rear caster wheels removed;

FIGS. 5 and 6 are detail elevations, with parts broken away, illustrating the pivoted connection of the side supporting elements to the front steering column of the vehicle; and FIG. 7 is a diagram of the movement of the caster wheels in effecting the forward propulsion of the vehicle.

Referring to FIGS. 1-4, the vehicle illustrated comprises a front steering wheel 10 pivoted in the bifurcated lower end 11 of an upright steering column 12 having a suitable steering hand control bar 13 at its upper end. Steering column 12 provides a pivotal connection for a pair of side frames 14, each having an individual foot support board 15 and a caster wheel 16 slightly to the rear of the footboard, the caster wheel 16 being provided with ball bearings.

Side frames 14 each include a frame element 17 connected to the mid portion thereof and extending upwardly and forwardly of the side frame 14 for pivotal connection with the steering column 12. These frames are each reinforced by an upright connection frame element 17. Referring to FIGS. 5 and 6, it will be seen that movement of frame bearing elements 14' and 17' with respect to steering column 12 is prevented by the stops afforded by the shoulder 19 at the top of bifurcated element 11 and the collar 20 on steering column 12 above frame elements 17. Thus the supporting elements of the vehicle are sturdily connected in a manner to permit lateral swinging movement only of the side frames with respect to the steering column.

Figure 6:
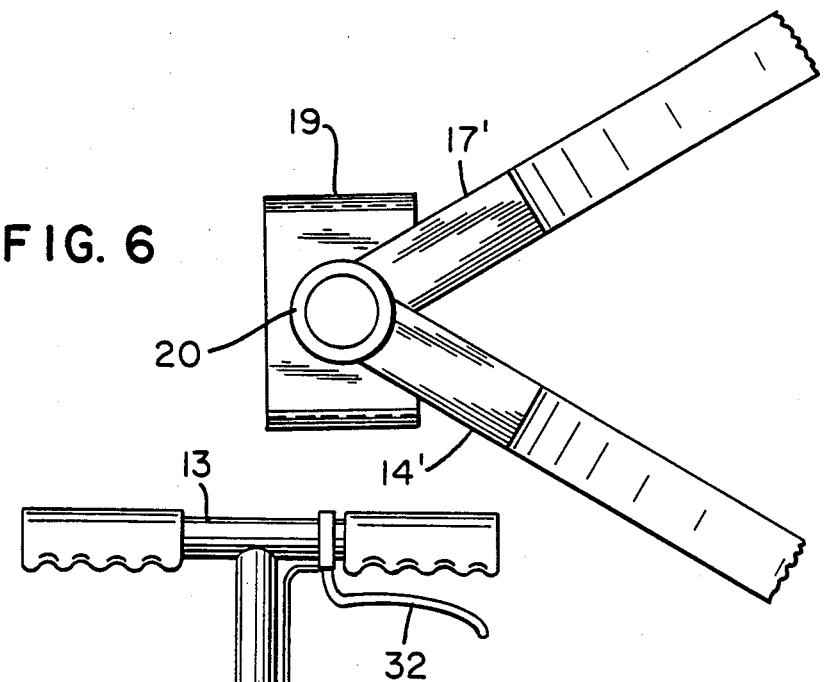
Figure 3:
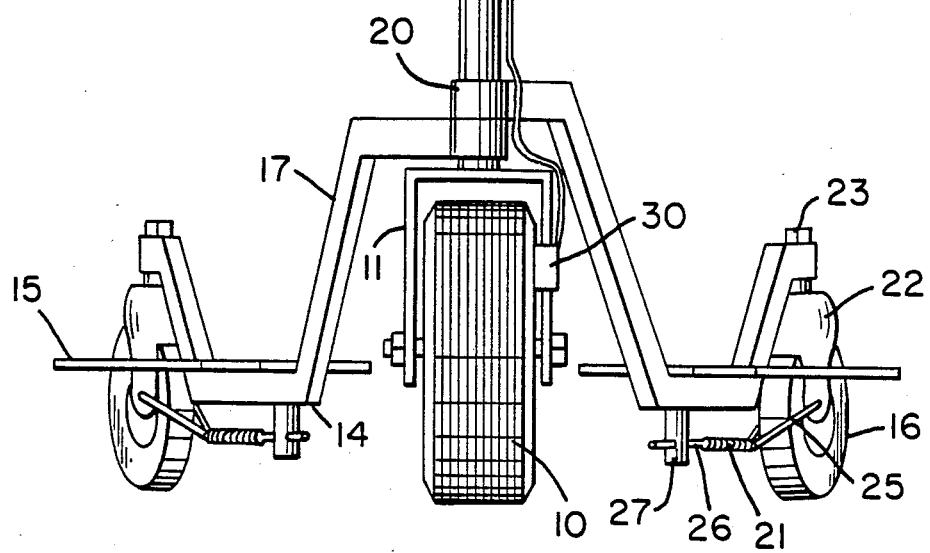
FIG. 3 is a front elevation of the vehicle.

In this construction, by affording lateral swinging movement of the independent side frame foot supports on the steering column, the steering column 12 also provides for turning movements of the steering column 12 with respect to the frame members so that the vehicle may be steered by the steering handle bar 13 in the customary manner of scooters and similar vehicles. In the preferred embodiment of the present invention, the steering wheel is provided with a set of brakes 30 which are operatively connected, by cable 31, to the handle bar 13 through grip mechanism 32. (See FIG. 3).

In the propulsion of the vehicle by body movements, that is, leg movements to effect lateral swinging movements of the side frames with respect to each other and the steering column, the important element for performing the vehicle propulsion is the control of the caster wheels 16. This consists of a tensioning element comprising a spring 21 for each caster wheel 16 which maintains the caster wheel 16 in line with frame element 14, but yieldable to permit a limited swinging movement thereof; this is indicated in FIG. 2.

As is shown in FIG. 1, the caster wheels 16 are each mounted in a swivel caster mounting 22 and are connected to the rear end of frame elements 14 by a vertical pivot 23 and a horizontal pivot 24, the wheels 16 being located to the rear of the vertical pivots 23. The caster mountings 22 are provided with ball bearings to effect a smoother lateral swinging movement. Caster mountings 22 each have a forward extension arm 25 to which the rear end of a spring 21 is secured. The forward end of spring 22 is connected to a link 26 having a threaded shank and extending through a support 27 which extends from the lower side of frame element 14 below the footboard 15. A nut 28 on the threaded shank of link 26 secures spring 21, providing a means for adjusting the tension of spring 21.

In operation, when pressure is applied by the feet to force the frames apart, as indicated in dotted lines in FIG. 2, that is, an outward stroke, the casters will turn, as shown, against the tension of springs 21 and thus cause the wheels 16 to start turning. On the inward return stroke the casters will turn in the opposite direction, causing movement in a zigzag track, as indicated in FIG. 7. The speed and hill climbing will be governed by the tension of springs 21, which is adjusted by nuts 28 on the threaded shanks of links 26. The operator can obtain a considerable speed of the vehicle by standing on footboards 15 and exerting inward and outward forces, effecting the swinging movement of the side frames.

Having set forth a highly satisfactory embodiment of my invention, it should be understood that my invention is not limited to the exact construction illustrated. Rather, it is contemplated that the principles of the invention may be expressed in various modified constructions.

What is claimed is:

1. A scooter-type vehicle that can be propelled by the action of the rider, the vehicle comprising:
    a front steering wheel;
    a front steering column connected to the steering wheel and adapted to steer the same; and
    a pair of rearwardly extending foot support frames connected to said front steering column in such a manner that said foot support frames are capable of independent sidewise swinging movement; and
    a pair of rear supporting wheels, each connected to a foot support frame at the portion thereof remote from said front steering column, said rear supporting wheels being connected to said foot support frames by means of swivel caster mountings so that lateral movements of said foot support frames propel said vehicle in a forward direction.

2. A vehicle according to claim 1, and further comprising means for tensioning said swivel caster mountings in such a manner that each of said rear supporting wheels is maintained in line with the direction of movement of said vehicle while being yieldable to permit sidewise swinging of said swivel caster mountings when said foot support frames are moved laterally with respect to one another.

3. A vehicle according to claim 2, wherein said means for tensioning said swivel caster mounting comprises:
- a pair of forwardly extending arms which are connected at one end to each of said swivel caster mountings;
- a pair of support elements which extend from the lower side of each of said rearwardly extending foot support frames; and
- a pair of springs which are connected at one end to each of said forwardly extending arms and at the other end to each said support elements; each of said springs being connected to said support element by means of a link having a threaded shank which extends through said support element and is fixed thereto by means of a nut on said threaded shank.

4. A vehicle according to claim 1, wherein each of said rearwardly extending foot support frames comprises a sleeve at the end thereof adapted to mate with said front steering column, and wherein said front steering column resides within said sleeves of said foot support frames.

5. A vehicle according to claim 4, and further comprising bearing means intermediate said sleeves and said steering column.

6. A vehicle according to claim 1, and further comprising hand-actuated brake means associating with said front steering wheel.

* * * * *